(12) United States Patent
Walker et al.

(10) Patent No.: US 6,338,049 B1
(45) Date of Patent: *Jan. 8, 2002

(54) USER-GENERATED TRAVELER'S CHECKS

(75) Inventors: Jay S. Walker, Ridgefield; T. Scott Case, Darien, both of CT (US)

(73) Assignee: Walker Digital, LLC, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/811,703

(22) Filed: Mar. 5, 1997

(51) Int. Cl.[7] .............................................. G06F 17/60
(52) U.S. Cl. ........................... 705/44; 705/45; 705/51; 705/57; 705/59; 235/379; 235/380; 235/381; 902/18
(58) Field of Search ............................. 705/44, 45, 51, 705/57, 59; 395/114; 235/379, 380, 381; 902/18; 364/705.02

(56) References Cited

U.S. PATENT DOCUMENTS 3,611,292 A   10/1971   Brown et al. ............... 235/380

(List continued on next page.)

FOREIGN PATENT DOCUMENTS

EP            715282 A2  *  5/1996

OTHER PUBLICATIONS dialog file 15, 01107434, "Instant cover sold through the TV set", Insurance Systems Bulletin, v11n3, pp. 1–2, Sep. 1995.* dialog file 15, 00863845, "Future branch", Credit Union Management, v17n5, pp. 26–29, Nov. 1994.*
C. Deogun, Nikhil, "News ATMs Can Do It All", The Orange County Register, Jun. 6, 1996, Business Section, p. C04.
D. Deogun, Nikhil, "Newest ATMs Dispense a Variety of Items", The Houston Chronicle, Jun. 10, 1996, Business Section, p. 5.
E. Epper, Karen, "Amex to Sell Travelers Checks Through ATMs", The American Banker, Jun. 1, 1994, Technology Report Section, p. 16.
F. Gullo, Karen, "ATMs to Dispense Travelers Checks", The Associated Press, May 31, 1994, Business News Section.
G. Tyson, David O., "American Express to Install USSR's First ATMs", The American Banker, Jun. 17, 1988, p. 7.
H. "Business Digest International Insurance; Vehicles; Foreign Government; Metals; Energy", The Courier–Journal, Jun. 1, 1994, Business Section, p. 8B.
I. "ATMs and Travelers Checks: Worthwhile for Bankers?", ABA Banking Journal, Jan., 1981, p. 82.

(List continued on next page.)

Primary Examiner—Eric W. Stamber
Assistant Examiner—Raquel Alvarez
(74) Attorney, Agent, or Firm—Dean P. Alderucci

(57) ABSTRACT

A system and method for issuing travelers checks at a user's home or business using the purchaser's own computer system to allow the user to obtain travelers checks at any time, in any denominations and without having to travel to an issuer location. User information, including a user identifier and a quantity and face value of bearer notes to be issued, are received from a user at an issuer central controller. The issuer central controller generates at least one code for generating the bearer notes and transmits the code to the user. Bearer notes including the code are then generated. Preferably, the user has registered with the note issuer prior to issuance of the notes. During registration, information relating to the user, such as identifying information and an account identifier are received from the user and stored in a database. A user identifier is transmitted to the user.

28 Claims, 20 Drawing Sheets

U.S. PATENT DOCUMENTS

| | | | |
|---|---|---|---|
| 3,617,638 A | 11/1971 | Jochimsen et al. | 379/91.01 |
| 3,697,693 A | 10/1972 | Deschenes et al. | 705/38 |
| 3,792,446 A * | 2/1974 | McFiggins | 705/403 |
| 3,950,013 A | 4/1976 | Tagliaferri | 283/100 |
| 3,950,015 A | 4/1976 | Shrock | 283/70 |
| 4,299,073 A | 11/1981 | Golicz et al. | 53/493 |
| 4,321,672 A | 3/1982 | Braun et al. | 705/42 |
| 4,341,951 A | 7/1982 | Benton | 705/41 |
| 4,630,201 A | 12/1986 | White | |
| 4,672,377 A | 6/1987 | Murohy et al. | 340/825.34 |
| 4,683,536 A | 7/1987 | Yamamoto | 705/17 |
| 4,837,422 A | 6/1989 | Dethloff et al. | 235/380 |
| 4,870,596 A | 9/1989 | Smith | 364/479.05 |
| 4,948,174 A | 8/1990 | Thomson et al. | |
| 4,997,188 A | 3/1991 | Nilssen | 705/14 |
| 5,010,485 A | 4/1991 | Bigari | 705/17 |
| 5,023,782 A | 6/1991 | Lutz et al. | 705/45 |
| H1019 H | 2/1992 | Feldman et al. | |
| 5,144,630 A | 9/1992 | Lin | 372/22 |
| 5,176,224 A | 1/1993 | Spector | |
| 5,393,963 A * | 2/1995 | Thomas et al. | 705/45 |
| 5,426,281 A | 6/1995 | Abecassis | 235/379 |
| 5,442,162 A * | 8/1995 | Armel | 235/381 |
| 5,458,938 A | 10/1995 | Nygard et al. | |
| 5,557,518 A * | 9/1996 | Rosen | 380/24 |
| 5,570,465 A * | 10/1996 | Tsakanikas | 705/14 |
| 5,594,226 A | 1/1997 | Steger | |
| 5,679,940 A * | 10/1997 | Templeton et al. | 235/380 |
| 5,703,344 A | 12/1997 | Bezy et al. | |
| 5,798,508 A * | 8/1998 | Walker et al. | 235/380 |

OTHER PUBLICATIONS

J. "Attention News/Business Editors: American Express Travelers Cheques Available over Telephone", Canada NewsWire, Feb. 14, 1996, Financial News Section.

K. Kutler, Jeffrey, "Citicorp Travelers Checks Will Feature Mail Delivery With Signature Imprint", The American Banker, Jul. 18, 1980, p. 1.

L. "Amex Offers Cheques on Call", Bank Letter, vol. XV, No. 30, p. 8.

M. Singletary, Michelle, "Banks Branch Out Over the Phone; Electronic Options, and Users, Multiply", The Washington Post, Jun. 21, 1996, Financial Section, p. D01.

Express Reservations has been Upgraded! America Online, Oct. 10, 1996.

Susan Zimmerman, "ATMs, Direct–debit Systems, More . . . ", Supermarket News, May 6, 1985 at p. 48.

Eve, Tahmincioglu, "Retailers Seek to Take the Risks Out of Checks".WWD, Aug. 23, 1990 at p. 7.

Stephen J. Ebert, "Stop Counterfeits; Check Validation Systems", Corporate Cashflow Magazine, Jan. 1991, at p. 32.

Doug Abrams, "Little Bank, Big World", The Washington Times, Jun. 7, 1996 at p. B7.

Ester Surden, "Checks Shifting From Paper to Pulse", RIS News, Apr. 1998 at p. 12.

Web Site: "Special Services" (http://www.206.222.26.211/special.htm), Dime Bank, Jun. 1, 1997.

Web Site: "Check Guarantee for Your Merchant Account" (http://www.merchantcards.net.check.html), download date: May 6, 1998.

Web Site: "CrossCheck's Company Home Page" (http://www.cross–check.com/company.htm), download date: May 6, 1998.

Web Site: "Quick–Checks . . . Check Guarantee Service" (http://www.quick–check–payment.com/guarantee.htm), download date: May 6, 1998.

Brochure: "Take Checks? Trust SCAN", Deluxe Payment Protection Systems, Inc., copyright: 1997.

PCT Search report for co–pending PCT application No. PCT/US98/02245 dated Sep. 9, 1998.#jf139##

TRAVELERS CHECK ORDER DATABASE 225

| | ORDER NUMBER 302 | NUMBER OF CHECKS 304 | TOTAL PURCHASE AMOUNT 306 | REGISTRATION CODE 308 | VERIFICATION CODE 310 | COMPLETION CODE 312 |
|---|---|---|---|---|---|---|
| 314a | 123456789ABCD | 25 | $10,000.00 | FURHGN-1456 | 2334456-FNTY56 | 2345-TYHGN |
| | | | | | | |
| | | | | | | |

FIG. 3A

TRAVELERS CHECK DATABASE 222

| | DATE 320 | ORDER NUMBER 321 | CHECK SERIAL NUMBER 322 | CHECK AMOUNT 323 | REGISTRATION CODE 324 | AUTHORIZATION CODE 325 | STATUS 326 | DATE USED 327 | MERCHANT LOCATION 328 |
|---|---|---|---|---|---|---|---|---|---|
| 330a | 2/22/97 | 1A-22 | 1234567 | $50.00 | 1A2B3C4 | 4C3B2A1 | UNCASHED | 2/25/97 | STAMFORD |
| | | | | | | | | | |
| | | | | | | | | | |

FIG. 3B

| 348a | NAME 340 | ADDRESS 341 | PHONE 342 | CREDIT CARD NUMBER 343 | CREDIT CARD EXPIRATION 344 | ORDER NUMBER 345 | CUSTOMER ID NUMBER 346 |
|---|---|---|---|---|---|---|---|
| | ABCD EFGHIJKL | 1234 ABCD ST. | 203-456-7890 | 1234567890 | 11/22/97 | 4567 | 1234-5678 |
| | | | | | | | |
| | | | | | | | |

ISSUER SOFTWARE MEMBERSHIP DATABASE 224

| NAME 360 | STORE NAME 361 | PHONE NUMBER 362 | LOCATION 363 | REGISTRATION ID NUMBER 364 |
|---|---|---|---|---|
| JOHN SMITH | JOHN'S STORE | 123-456-7890 | ELM STREET | 1234-56789abc |
| 366a | | | | |

USER-GENERATED TRAVELER'S CHECKS

CROSS REFERENCE TO RELATED APPLICATIONS

This application is related to co-pending U.S. patent application Ser. No. 09/106,888 entitled "METHOD AND APPARATUS FOR PROCESSING CHECKS TO RESERVE FUNDS" filed in the name of Daniel E. Tedesco and James A. Jorasch on Jun. 29, 1998 and assigned to the assignee of the present invention.

FIELD OF THE INVENTION

The present invention relates to a bearer note, for example, a traveler's check that is generated at a remote location using local equipment, and systems and methods for generating and clearing such notes.

BACKGROUND OF THE INVENTION

Traveler's checks are well-known payment means offering advantages, such as security and wide acceptance. However, traveler's checks have a disadvantage in that a purchaser must physically go to an office of a traveler's check seller, such as a bank or travel service, in order to purchase and receive the checks. There are a limited number of such offices and their hours of operation are limited. This is inconvenient for the purchaser, who must travel to a seller's office during the specified hours. Some have attempted to deal with this problem by allowing purchasers to order checks over the telephone, but the checks must be delivered by mail or express service, causing a significant delivery delay. Others have attempted to deal with the problem by providing machines similar to automated teller machines (ATM), which issue traveler's checks. However, the purchaser still must find and travel to such a machine. In addition, such machines dispense only a limited selection of check denominations. As such, there is a need for a system with which purchasers may obtain traveler's checks at any time, in any denominations and without having to travel.

SUMMARY OF THE INVENTION

The present invention is a system and method for issuing traveler's checks at a user's home or business using the purchaser's own computer system. This allows the user to obtain traveler's checks at any time, in any denominations and without having to travel to an issuer location.

User information, including a user identifier and a quantity and face value of bearer notes to be issued, are received from a user at an issuer central controller. The issuer central controller generates at least one code for generating the bearer notes and transmits the code to the user. Bearer notes including the code are then generated.

Preferably, the user has registered with the note issuer prior to issuance of the notes. During registration, information relating to the user, such as identifying information and an account identifier are received from the user and stored in a database. A user identifier is transmitted to the user.

BRIEF DESCRIPTION OF THE DRAWINGS

The details of the present invention, both as to its structure and operation, can best be understood by referring to the accompanying drawings, in which like reference numbers and designations refer to like elements.

FIG. 2b is an exemplary block diagram of an issuer central controller system 200 of FIG. 2a.

FIG. 2c is an exemplary block diagram of a remote user terminal 252 or merchant terminal 254 of FIG. 2a.

FIG. 3a is an exemplary format of a traveler's check order database 225 of FIG. 2b.

FIG. 3b is an exemplary format of a traveler's check database 222 of FIG. 2b.

FIGS. 4a and 4b are flow diagrams of a user-generated traveler's check creation process 400, which is implemented in the system of FIG. 2a.

FIGS. 5a and 5b. are more detailed flow diagrams of a user-generated traveler's check creation process 500, which is a portion of process 400 of FIGS. 4a–b that is implemented in remote user terminal 252 of FIG. 2a FIGS. 6a and 6b are more detailed flow diagrams of a user-generated traveler's check creation process 600, which is a portion of process 400 of FIGS. 4a–b that is implemented in issuer central controller 200 and issuer voice response unit (IVRU) of FIG. 2a.

FIGS. 7a and 7b are flow diagrams of a user-generated traveler's check cancellation process 700, which is implemented in issuer central controller 200 and issuer voice response unit (IVRU) of FIG. 2a.

FIGS. 8a and 8b are flow diagrams of a user-generated traveler's check clearing process 800, which is implemented in issuer central controller 200 and issuer voice response unit (IVRU) 230 of FIG. 2a.

FIG. 9 is a flow diagram of an issuer voice response verification process 900, which is performed as part of step 806, shown in FIG. 8a, and is implemented in issuer central controller 200 and issuer voice response unit (IVRU) 230 of FIG. 2a.

DETAILED DESCRIPTION OF THE INVENTION

Figure 1A:
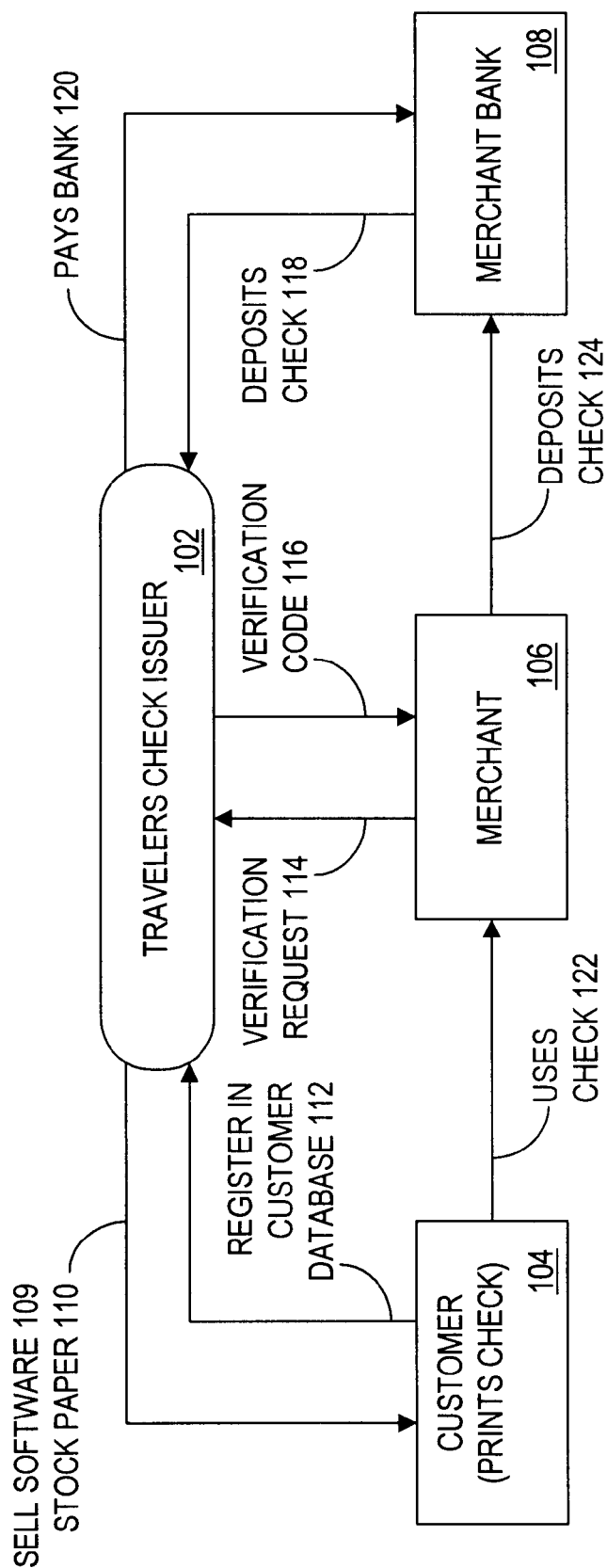
FIG. 1a is a block diagram illustrating the issuance, acceptance and clearance of a user-generated traveler's check, according to the present invention.

The data and material flow of the issuance, acceptance and clearance of a user-generated bearer note, according to the present invention, is shown in FIG. 1a. In the described embodiment, the bearer note comprises a traveler's check, which is a well-known payment draft issued by a bank or express company, signed by the purchaser at the time of purchase and again at the time of cashing as a security precaution. Well-known traveler's check issuers include American Express, Citibank, Thomas Cook, etc.

Traveler's check issuer 102 provides software 109 and, optionally, traveler's check stock paper 110 to user 104. User 104 installs software 109 on an appropriate computer system and registers appropriate information 112 in a user database maintained by issuer 102. The user may register by sending in a registration mailer that accompanies the software. The mailer may include preprinted information identifying the particular copy of software that the user has, such as a serial number of the software. The user enters identifying information on the mailer, such as his name and address, etc. The user may also be required to enter a credit card account number that will be used to pay for any traveler's checks that are issued, as well as a password to be used during the issuance process. Registration may also be performed over the telephone, with either a human operator or an automated voice response unit, which will prompt the user for the required information, or using the remote user terminal and a modem or network connection to communicate the required information to a central controller maintained by issuer 102.

When user 104 wishes to obtain a traveler's check, user 104 generates the check using his local equipment in a process described below. User 104 may retain the check for spending up until a pre-established expiration date, at which time the check will be non-negotiable. User 104 may use the check at merchant 106 by countersigning and transferring it to merchant 106. Merchant 106 may be a seller of goods or services, or may be a bank or money exchange bureau. Before accepting the check, merchant 106 transmits a verification message 114 to issuer 102. Issuer 102 verifies the validity of the check, and if it is valid, transmits an authorization code 116 to merchant 106. Upon receipt of the authorization code, merchant 106 accepts the check from user 104.

Merchant 106 deposits 124 the countersigned check at its merchant bank 108. Merchant bank 108 forwards the check 118 to issuer 102 for clearing and payment. Upon clearing the check, issuer 102 transmits payment 120 to merchant bank 108, which is credited to the account of merchant 106.

Figure 1B:
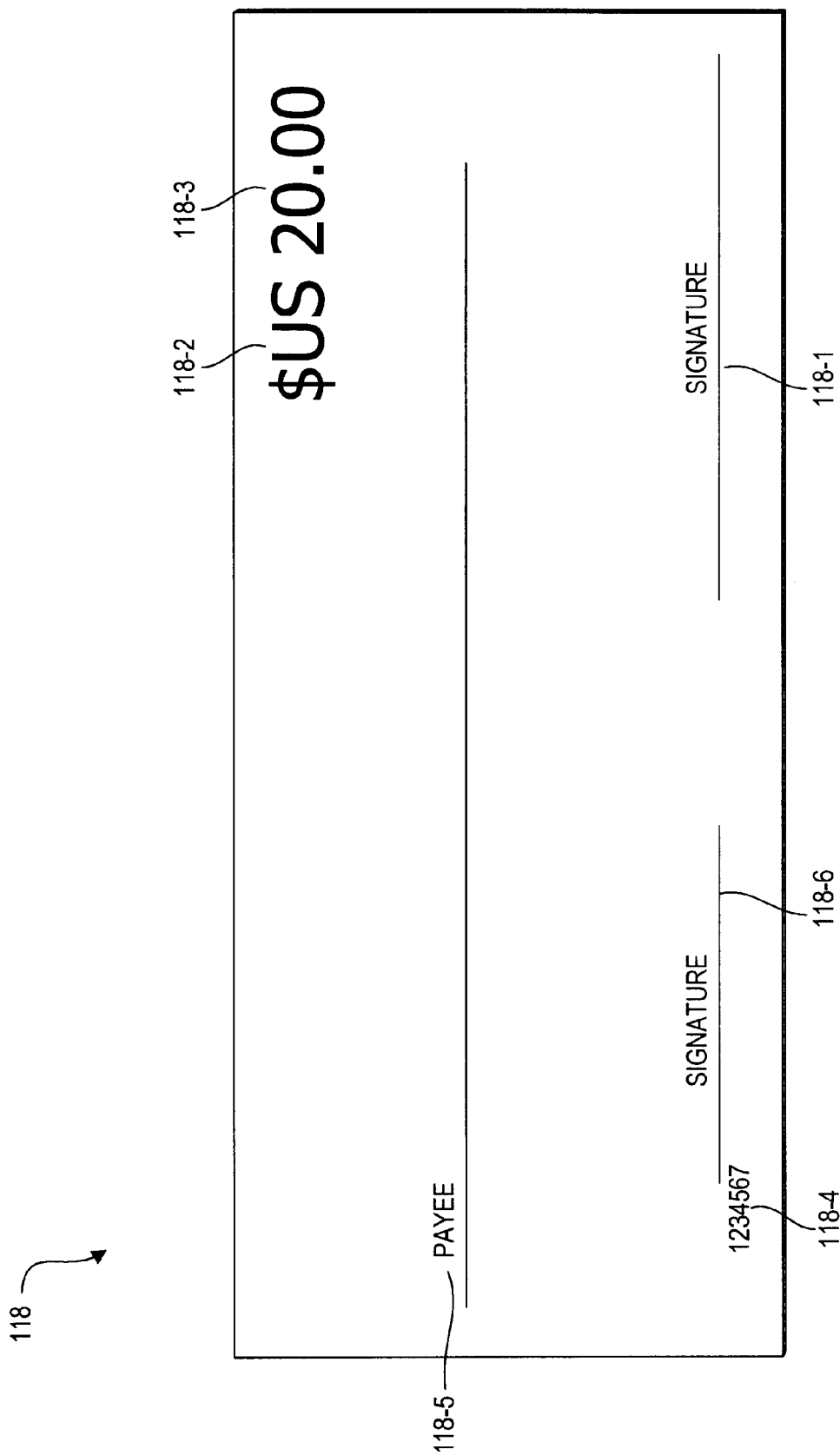
FIG. 1b shows a user-generated traveler's check, according to the present invention.

A user-generated traveler's check 118 according to the present invention is shown in FIG. 1b. Check 118 includes a signature 118-1 of the user, a denomination 118-2 and face value 118-3, an optional counter-signature 118-6, and a serial number 118-4. Counter-signature 118-6 is optionally inscribed by the user upon purchase, and signature 118-1 is inscribed by the user upon use. As will become apparent from a consideration of the following description, while counter-signature 118-6 provides some increased level of security, the invention may be practiced without the countersignature.

A denomination 118-2, face value 118-3 and serial number 118-4 are printed on the check by the user during the issuance process, which is described below. Serial number 118-4 is generated based on information related to the check and the user, such as, for example, the face value of the check and the name of the user, as is printed on the check. The serial number is used by merchant 106 to verify a check before accepting it.

Figure 2A:
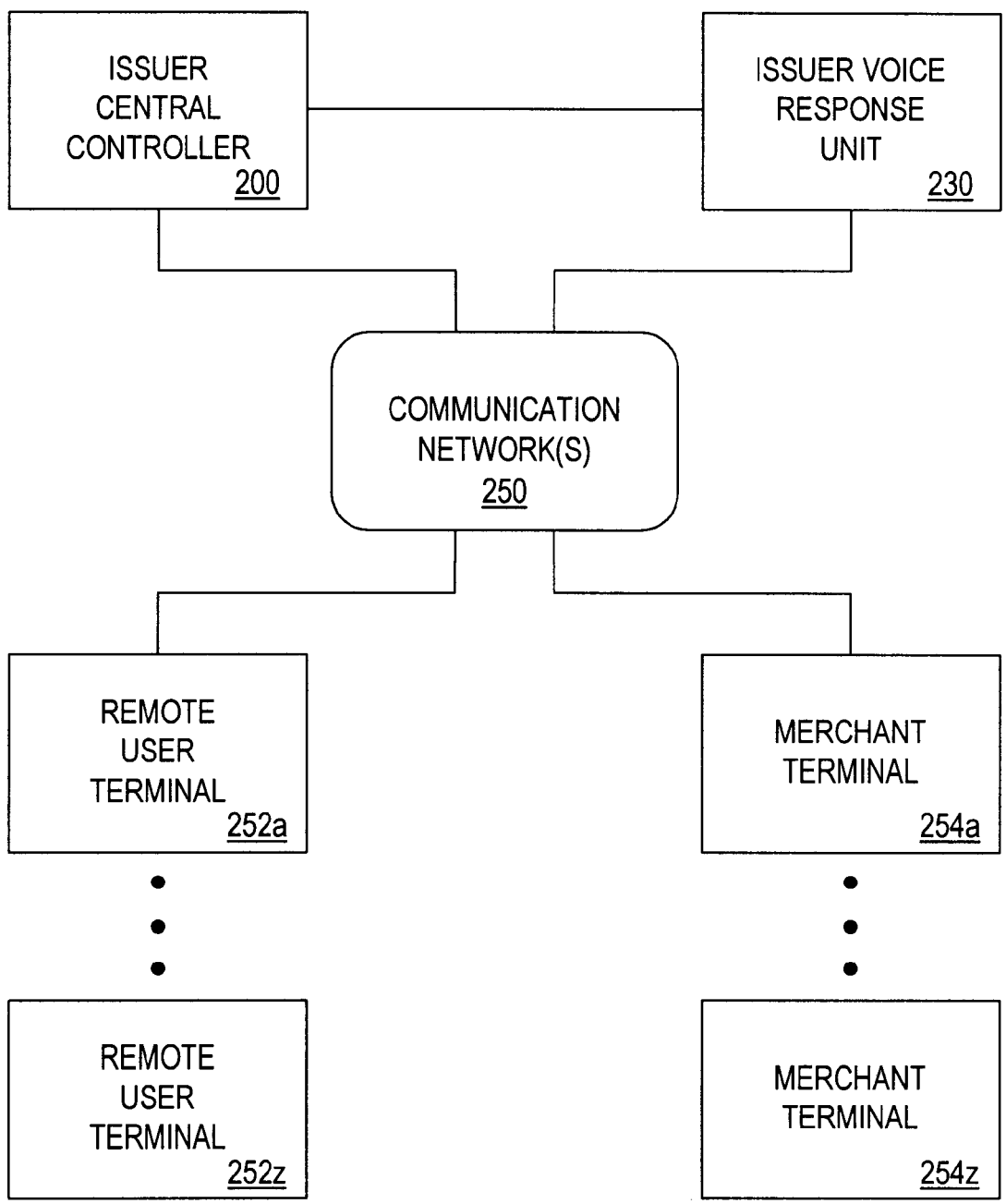
FIG. 2a is a block diagram of a system for issuing and clearing a user-generated traveler's check, according to the present invention.

A system for issuing and clearing a user-generated traveler's check, according to the present invention, is shown in FIG. 2a. The system includes issuer central controller 200, which is a communication and database system maintained by traveler's check issuer 102 of FIG. 1a, issuer voice response unit 230, communication network 250, a plurality of remote user terminals 252a–z, and a plurality of merchant terminals 254a–z. Communication network 250 provides communications among the other elements of the system. Issuer central controller 200 communicates information with remote user terminals 252 and verification information with merchant terminals 254a–z and stores the information for later use.

In one embodiment, a remote user terminal 252 communicates registration and issuance information directly with issuer central controller 200. In this embodiment, network 250 provides data communications between issuer central controller 200 and remote user terminal 252. In one alternative of this embodiment, network 250 is the public switched telephone network, while in other alternatives, network 250 may be the Internet (with appropriate security measures) or a private wide-area network.

In another embodiment, remote user terminal 252 is not in direct communication with issuer central controller 200. In this embodiment, a user operating the remote user terminal places a call to issuer central controller 200. The call is handled by a two-way audio connection over communication network 250, which is the public switched telephone network. The call is routed to and handled by issuer voice response unit (IVRU) 230. The user receives voice prompts and tones from IVRU 230 and transmits commands using touch-tone signals or voice commands. Registration and issuance information is entered and received by the user via IVRU 230. The information received by the user is then entered by the user into remote user terminal 252.

Merchant terminal 254 communicates with issuer central controller in a manner similar to remote user terminal 252. In one embodiment, a merchant terminal 254 communicates verification information directly with issuer central controller 200. In this embodiment, network 250 provides data communications between issuer central controller 200 and merchant terminal 254. In one alternative of this embodiment, network 250 is the public switched telephone network, while in other alternatives, network 250 may be the Internet (with appropriate security measures) or a private wide-area network.

In another embodiment, merchant terminal 254a is not in direct communication with issuer central controller 200. In this embodiment, a merchant operating a merchant terminal places a call to issuer central controller 200. The call is handled by a two-way audio connection over communication network 250, which is the public switched telephone network. The call is routed to and handled by issuer voice response unit (IVRU) 230. The merchant receives voice prompts and tones from IVRU 230 and transmits commands using touch-tone signals or voice commands. Verification information is entered and received by the user via IVRU 230. The information received by the merchant is then entered by the user into merchant terminal 254a.

Figure 2B:
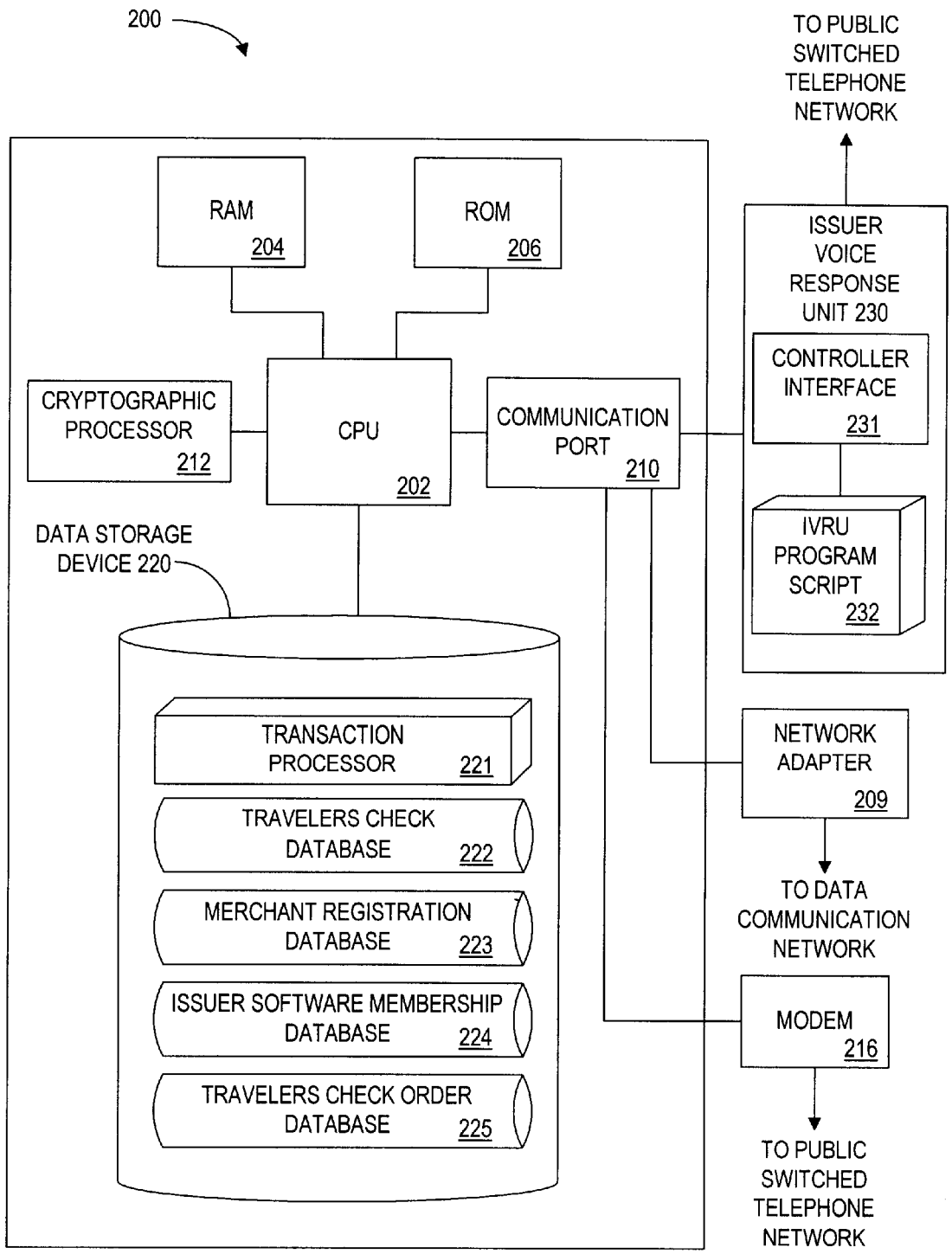

An exemplary issuer central controller system 200 is shown in FIG. 2b. Controller 200 includes central processing unit (CPU) 202, which is connected to random access memory (RAM) 204, read-only memory (ROM) 206, communication port 210, cryptographic processor 212 and data storage device 220. CPU 202 may comprise a microprocessor, for example, an INTEL PENTIUM processor, or CPU 202 may comprise a mini-computer or mainframe processor. RAM 204 and ROM 206 store program instructions that are executed by CPU 202 and data that is used during program execution. Communication port 210 couples controller 200 to issuer voice response unit 230, network adapter 209 and modem 216, which provide communications between issuer central controller 200 and the remote user terminals 252a–z and/or merchant terminal 254a. A typical system need not include all three devices, voice response unit 230, network adapter 209 and modem 216. Only those devices that are needed to implement the communication techniques selected by the check issuer must be present. Preferably, communications over the public switched telephone network, via modem 216, will be used.

Cryptographic processor 212 encrypts and decrypts digital information which is used to ensure security of the traveler's checks. In one embodiment, processor 212 is a separate physical processor, such as a networked computer system or a daughtercard processor, running cryptographic software. In another embodiment, processor 212 is implemented in software that is executed by CPU 202. Data storage device 220, which stores data that is used by the present invention, may comprise, for example, a magnetic disk and/or optical disk and may also comprise a magnetic tape.

Storage device 220 includes transaction processor 221, traveler's check database 222, merchant registration database 223, issuer software membership database 224 and traveler's check database 225. Transaction processor 221 accepts input from CPU 202, accesses the appropriate database and stores information in or retrieves information from that database. Transaction processor 221 may comprise a separate processor or may comprise a part of CPU 202. Traveler's check database 222 stores information about each traveler's check that is issued. Merchant registration database 223 stores information about each merchant that accepts traveler's checks. Issuer software membership database 224 stores information about each software user who has registered with the issuer. Traveler's check order database 225 stores information about each traveler's check order that has been placed.

Figure 2C:
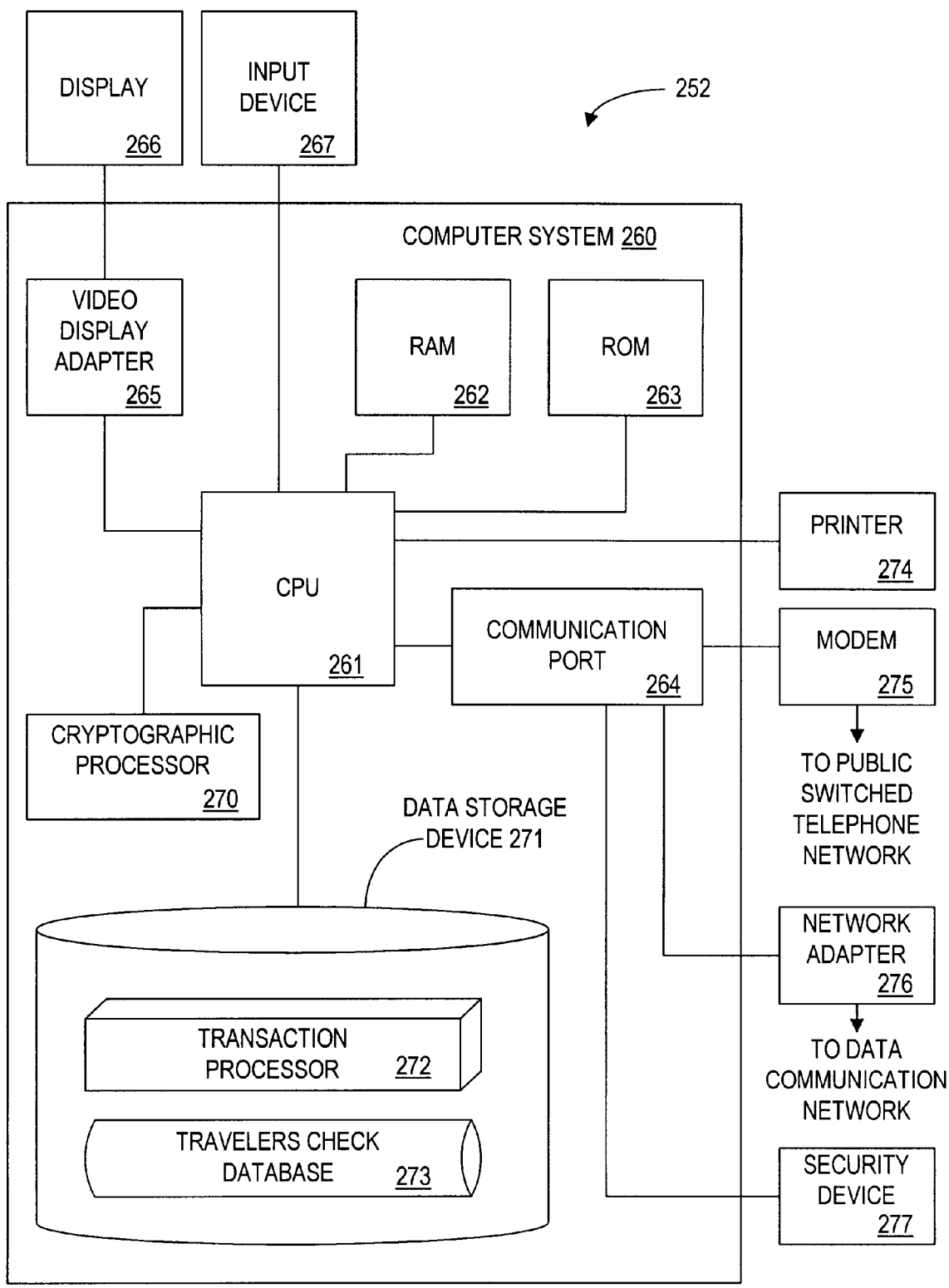

An exemplary remote user terminal 252 is shown in FIG. 2c. Terminal 252 includes computer system 260, which is connected to printer 274, modem 275, network adapter 276 and security device 277. Computer system 260 includes central processing unit (CPU) 261, which is connected to random access memory (RAM) 262, read-only memory (ROM) 263, communication port 264, cryptographic processor 270 and data storage device 271. RAM 262 and ROM 264 store program instructions that are executed by CPU 260 and data that is used during program execution. CPU 261 is coupled to printer 274, which is a conventional printer, such as a dot-matrix, ink jet or laser printer. Communications port 264 couples computer 260 to modem 275 and network adapter 276, which provide communications between the remote user terminal 252 and issuer central controller 200, over communications network 250. A typical system need not include both devices, network adapter 276 and modem 275. Only the device that is needed to implement the communication techniques selected by the check issuer must be present. In one embodiment, the terminal is coupled by modem 275 to the public switched telephone network. In another embodiment, the terminal is coupled to a private wide-area network via network adapter 276. Preferably, communications over the public switched telephone network, via modem 275, will be used.

Cryptographic processor 270 encrypts and decrypts digital information which is used to ensure security of the traveler's checks. In one embodiment, cryptographic processor 270 is a separate physical processor running cryptographic software, such as a daughtercard processor or a processor contained in a "dongle" connected to computer system 260. In another embodiment, cryptographic processor 270 is implemented in software that is executed by CPU 261. In another embodiment, cryptographic processor 270, which is either hardware or software, communicates with security device 277, which is connected to computer system 260, typically in the form of a "dongle". Security device 277 may contain the cryptographic keys that are used to encrypt and decrypt data.

Data storage device 271, which stores data that is used by the present invention, may comprise, for example, a magnetic disk and/or optical disk and may also comprise a magnetic tape. Data storage device 271 includes transaction processor 272 and traveler's check database 273. Transaction processor 272 accepts input from CPU 261, accesses the appropriate database and stores information in or retrieves information from that database. Transaction processor 272 may comprise a separate processor or may comprise a part of CPU 261. Traveler's check database 272 stores information about each traveler's check that is issued by a remote user terminal 252 or each check that is accepted at a merchant terminal 254.

Printer 274 prints the traveler's checks to be issued in response to commands from computer system 260. Any modern printer capable of color printing may be used. Paper stock is inserted into printer 274, which then prints indicia such as the denomination 118-2, face value 118-3 and serial number 118-4, shown in FIG. 1b, according to a process described below. Conventional paper stock may be used for printing the checks. Optionally, special traveler's check paper stock, which may include, for example: preprinted information such as the issuer's name, or security features that prevent duplication (i.e. glyphs, watermarks, holograms, etc...), may be used.

Merchant terminal 254 is used only for verifying individual traveler's checks at the time of acceptance. Although a computer system similar to that of remote user terminal 252 may be used, this is not necessary. A device similar to the well-known credit card authorization terminals that are in widespread use may be used. Alternatively, the checks may be verified over the telephone.

An exemplary format of a traveler's check order database 225 is shown in FIG. 3a. Database 225 includes a plurality of records, such as, for example, record 314a. Each record corresponds to one order of traveler's checks and includes an order number field 302, a number of checks field 304, a total purchase amount field 306, a registration code field 308, a verification code field 310 and a completion code field 312. A record 314 is established for each traveler's check order that is received by central controller 200. An identification code that uniquely identifies each received order is generated by central controller 200 and stored in order number field 302. The number of checks issued in the order is stored in number of checks field 304. The total monetary value of the traveler's checks purchased in the order is stored in total purchase amount field 306. A code that was received from the user at the initiation of the check issuance process, the registration code, is stored in registration code field 308. A code that indicates that the information entered by the user during the check creation process has been verified by the traveler's check issuer, is stored in verification code field 310. The verification code is also transmitted to the user. A code that indicates that the remote user terminal has completed the check creation process is stored in completion code field 312. The completion code is received from the user.

An exemplary format of a traveler's check database 222 is shown in FIG. 3b. Database 222 includes a plurality of records, such as, for example, record 330. Each record corresponds to one traveler's check that was issued and includes a date field 320, an order number field 321, a check serial number field 322, a check amount field 323, a registration code field 324, an authorization code field 325, a status field 326, a date used field 327 and a merchant location field 328. A record 330 is established for each traveler's check that is issued. The date on which a check was issued is stored in date field 320. The order number that identifies the order in which the check is included is stored in order number field 321. Information relating to the order is stored in a record in traveler's check order database 225 of FIG. 3a. The number stored in field 321 is the same as the number stored in field 302 of that record. The serial number of the check, which uniquely identifies the check, is stored in serial number field 322. The monetary face value amount of the check, including an indicator of the currency, is stored in check amount field 323. The registration code is stored in field 324. The code that is sent to the merchant that accepts the check, which authorizes the merchant to accept the check, is stored in authorization code field 325. The status of the check is stored in status field 326. When the check is issued, the status is set to "Uncashed". Later, after the user has used the check and the authorization code has been sent to the accepting merchant, the status is set to "Cashed". The date on which the check is cashed is stored in date used field 327. An identification code that uniquely identifies the particular business location of the merchant that accepted the check from the user is stored in merchant location field 328.

Figure 3C:
FIG. 3c is an exemplary format of an issuer software membership database of FIG. 2b.

An exemplary format of an issuer software membership database 224 is shown in FIG. 3c. Database 224 includes a plurality of records, such as, for example, record 348a. Each record corresponds to one traveler's check software package that is registered for use, and includes a name field 340, an address field 341, a telephone number field 342, a credit card account number field 343, a credit card expiration field 344, an order number field 325 and a customer ID number field 346. A record 348 is established for each user who registers with the traveler's check issuer. The user name is stored in name field 340. The user address is stored in user address field 341. The user telephone number is stored in telephone number field 342. The account number of the credit card that is used to purchase traveler's checks is stored in credit card account number field 343. The expiration date of the credit card is stored in credit card expiration field 344. An order number that identifies each order of traveler's checks that the user has placed is stored in order number field 345. An identification number that uniquely identifies the user is stored in customer ID field 346.

Figure 3D:
FIG. 3d is an exemplary format of a merchant registration database 223 of FIG. 2b.

An exemplary format of a merchant registration database 223 is shown in FIG. 3d. Database 223 includes a plurality of records, such as, for example, record 366a. Each record corresponds to a merchant that is authorized to accept traveler's checks, or to a particular business site of a merchant, if the merchant has more than one business site. Each record includes a name field 360, a store name field 361, a telephone number field 362, a location field 363 and a registration ID number field 364. A record 348 is established for each merchant or merchant site that registers with the traveler's check issuer. The merchant name is stored in name field 360. The name of the merchant site is stored in store name field 361. The telephone number of the merchant or the merchant site is stored in telephone number field 362. The geographic location of the merchant site is stored in location field 363. An identification number that uniquely identifies the merchant or merchant site is stored in registration ID field 364.

Figure 4A:
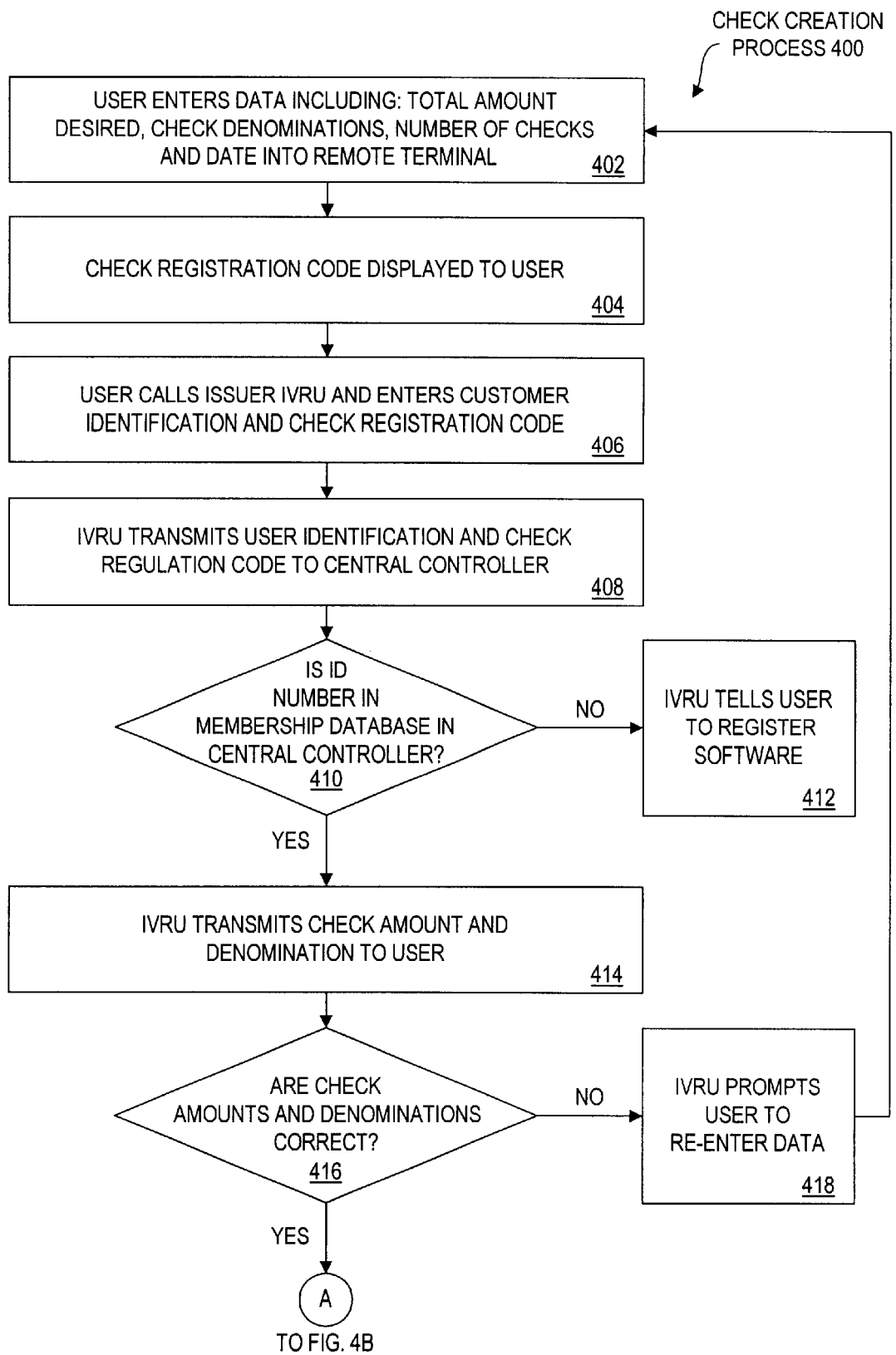
Figure 4B:
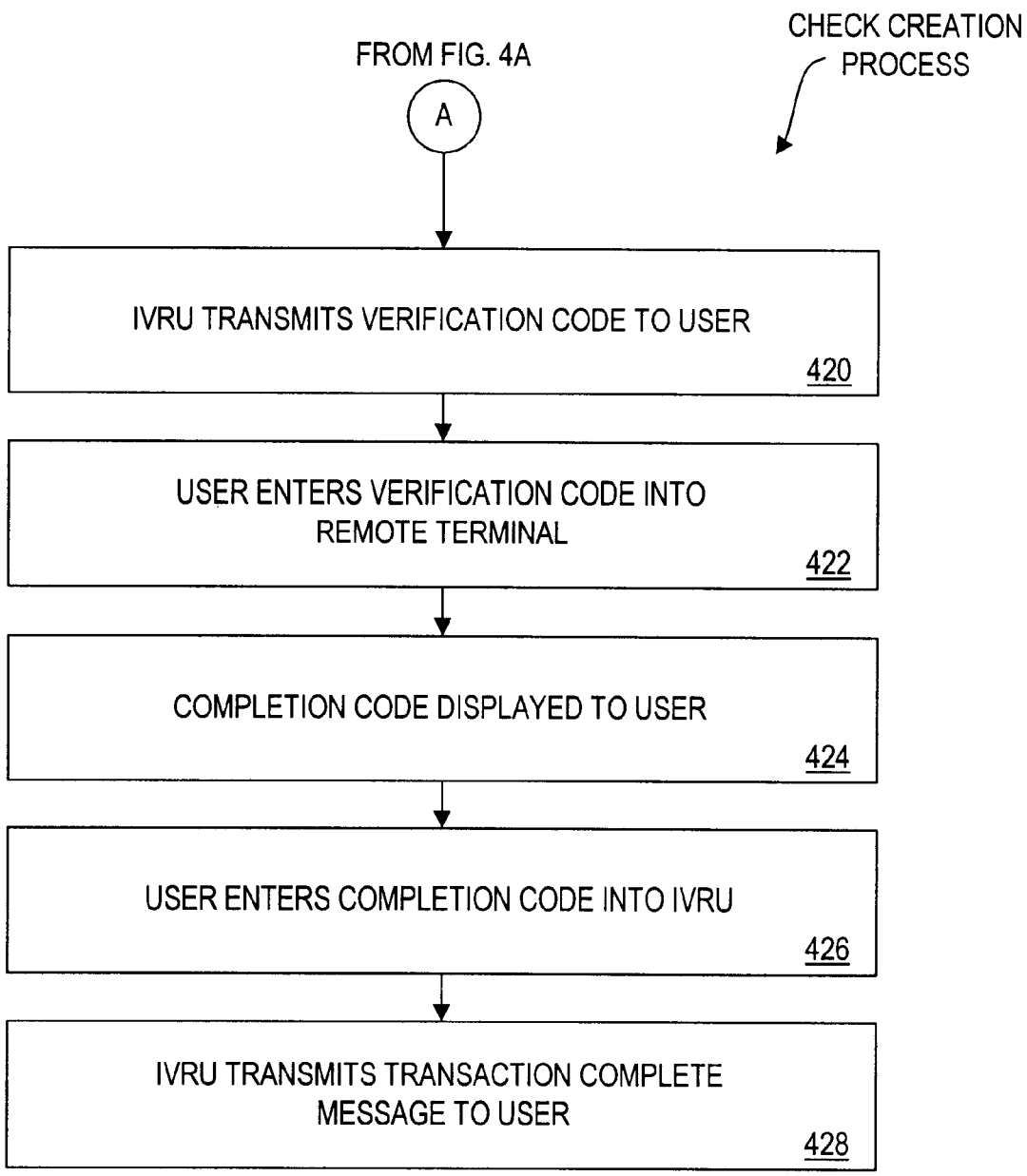

A user-generated traveler's check creation process 400, which is implemented in the system of FIG. 2a, and uses the databases shown in FIGS. 3a–d, is shown in FIGS. 4a–b. Steps 402–418 of process 400 are shown in FIG. 4a. Process 400 begins with step 402, in which a user enters information, which includes the total monetary amount of traveler's checks desired, the denominations and number of checks of each entered denomination that are desired, and the date, into a remote user terminal. Preferably, special check creation software is executing on the remote user terminal and the information is entered into the check creation software. In addition, the check creation software may automatically generate some of the required information. For example, the software may automatically enter the date, and may automatically generate the total monetary amount from the denominations and number of each denomination desired. In step 404, a check registration code is generated based on the entered information, for example as a function of the check denominations, date of the code generation, and total amount of the checks. This registration code is then displayed to the user on the remote user terminal. In step 406, the user places a telephone call to the issuer voice response unit (IVRU) 230 of central controller 200, and enters the customer ID and the check registration code in response to audio and voice prompts generated by the IVRU. In step 408, the IVRU transmits the customer ID and the check registration code to the central controller. In step 410, the central control determines whether the received customer ID is found in membership database 224, shown in FIG. 2b. If the received customer ID is not found in membership database 224, then in step 412, the IVRU informs the user of this fact and tells the user to register his copy of the software. In a preferred embodiment, the IVRU would then perform the registration process with the user.

If the received customer ID is found in membership database 224, then in step 414, the IVRU transmits the check denominations and numbers of each denomination, which were contained in the registration code, to the user for verification. In step 416, the user verifies the check denominations and numbers of each denomination and indicates to the IVRU whether or not the information is correct. If the information is not correct, then in step 418, the IVRU prompts the user to re-enter the information into the remote user terminal, and the process loops back to step 402. If the information is correct, the process continues with step 420.

Steps 420–426 of process 400 are shown in FIG. 4b. In step 420, the IVRU transmits a verification code to the user. In step 422, the user enters the verification code into the remote user terminal. In step 424, the remote user terminal generates a completion code based on the verification code, displays the, completion code to the user and commands the printer to print the traveler's checks. In step 426, the user transmits the completion code to the IVRU. In step 428, the IVRU transmits a transaction complete message to the user.

In an alternate embodiment of the invention, the actual printing of the traveler's checks is deferred until a later date selected by the user. Once all of the necessary information is available to create valid checks, they may actually be printed at any convenient time.

Other embodiments of the check creation process are possible. For example, instead of the user placing a telephone call to the IVRU, the remote user terminal may establish communications with the central controller over the public switched telephone network using a modem, or over a private network using a network adapter. The steps of process 400, in which the remote user terminal displays information to the user, the user transmits information to the IVRU, the IVRU transmits information to the user, and the user enters the information from the IVRU into the remote user terminal which would be replaced by steps in which the remote user terminal transmits information over the communication network to the central controller, and the central controller transmits information over the communication network to the remote user terminal.

Figure 5A:
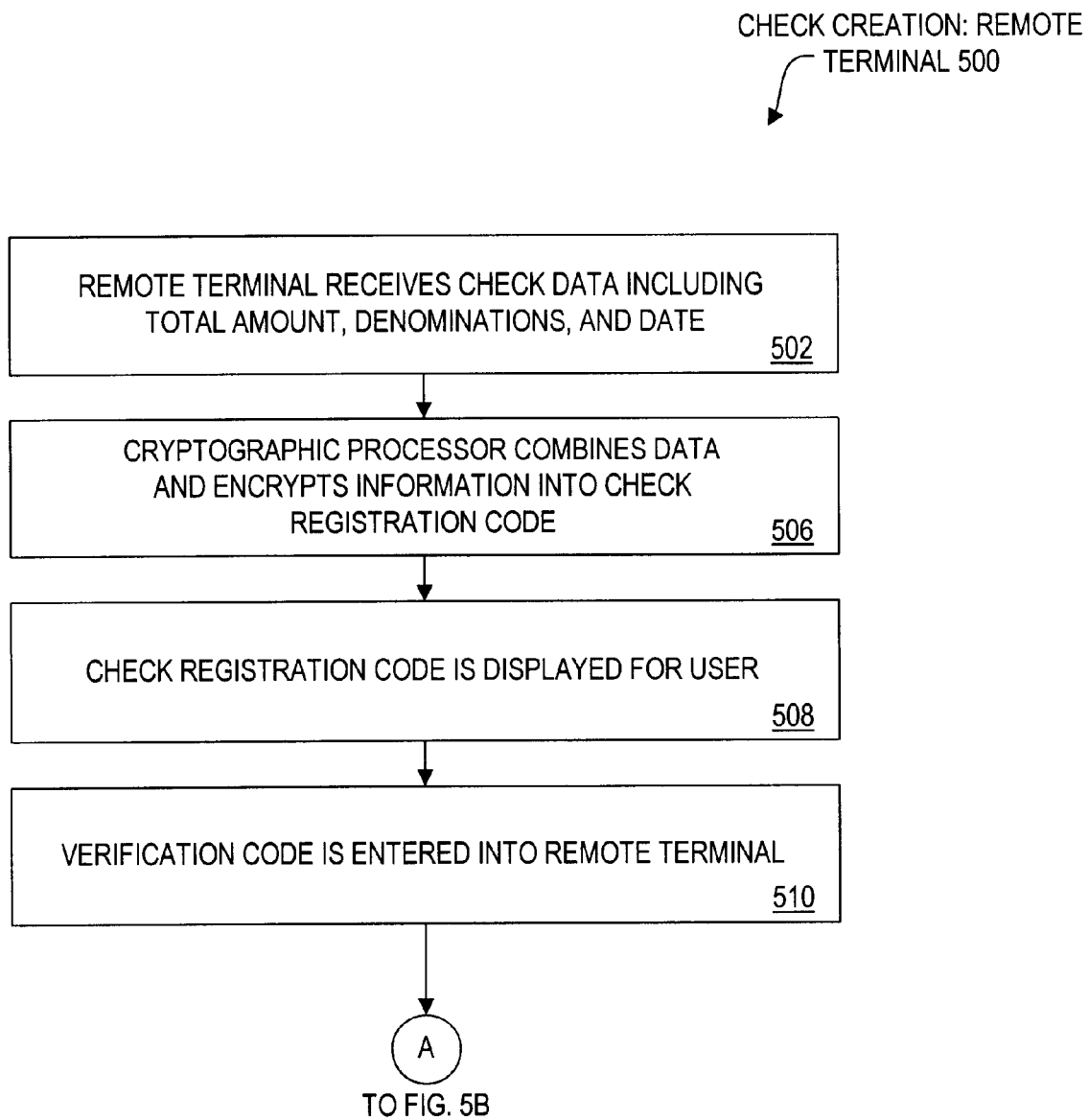
Figure 5B:
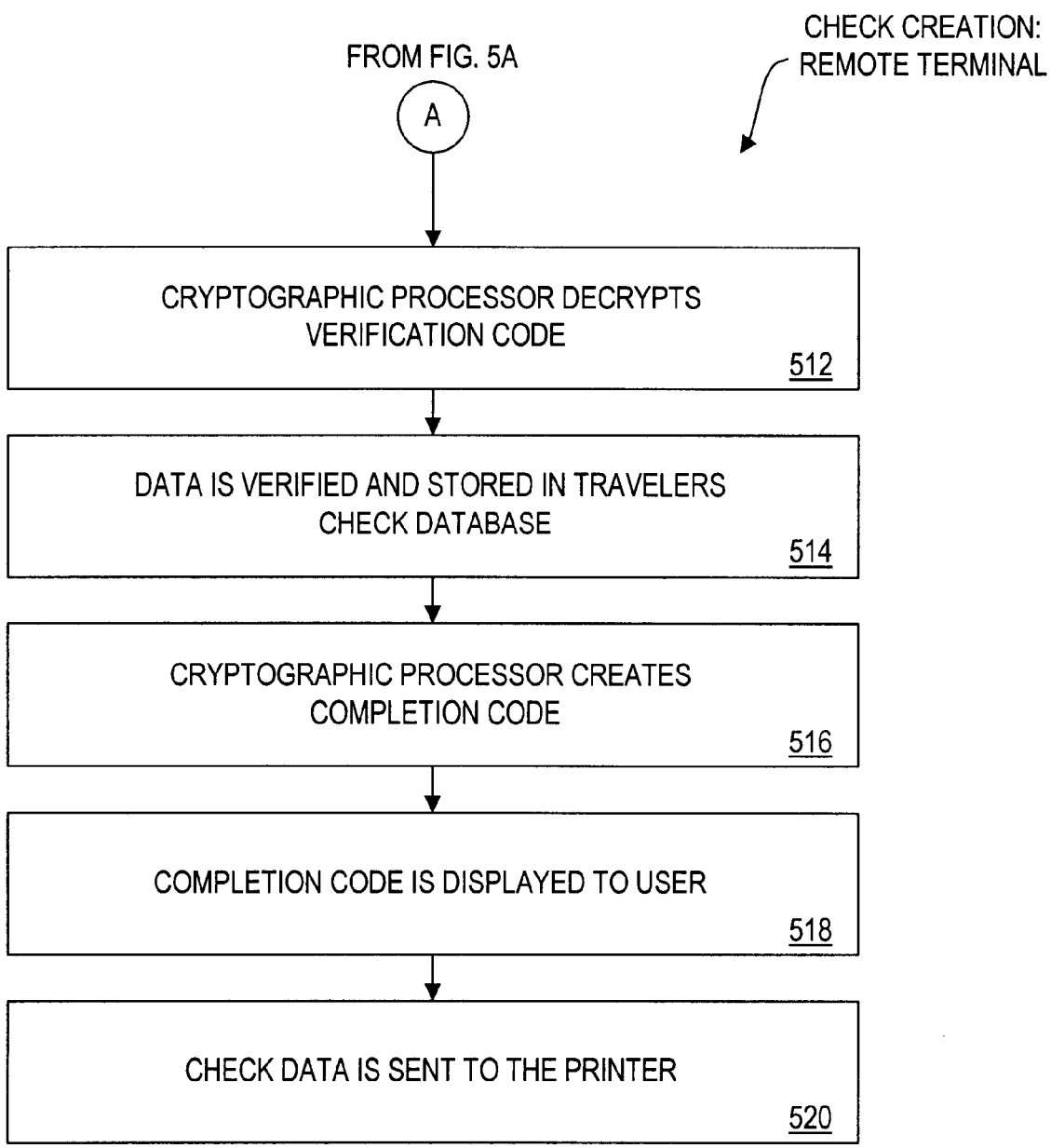

A more detailed description of portions of FIGS. 4a–b is shown in FIGS. 5a–b. A user-generated traveler's check creation process 500, is shown in FIGS. 5a–b. Process 500 is a portion of process 400 of FIGS. 4a–b that is implemented in remote user terminal 252 of FIG. 2c. Steps 502–510 of process 500 are shown in FIG. 5a. Process 500 begins with step 502, in which the remote user terminal receives the traveler's check information entered by the user in step 402 of FIG. 4a. The information includes the total monetary amount of traveler's checks desired, the denominations and number of checks of each entered denomination that are desired, and the date. Preferably, the remote user terminal generates some of this information, as described above. In step 506, the cryptographic processor generates a check registration code by combining and encrypting the user-entered data. In step 508, the remote user terminal displays the check registration code. As described above, the user transmits the check registration code to the issuer voice response unit (IVRU) and receives a verification code from the IVRU. In step 510, the user enters the verification code into remote terminal 252.

Steps 512–520 of process 500 are shown in FIG. 5b. In step 512, the cryptographic processor in the remote terminal decrypts the verification code generated by the issuer central controller and entered into the remote terminal by the user. In step 514, the decrypted data from the verification code is stored in the traveler's check database in the remote user terminal. In step 516, the cryptographic processor creates a completion code, which is displayed to the user in step 518. In step 520, check data is transmitted to the printer and the traveler's checks are printed.

As described above, other embodiments of the check creation process are possible. For example, instead of the user placing a telephone call to the IVRU, the remote user terminal may establish communication with the central controller over the public switched telephone network using a modem, or over a private network using a network adapter. The steps of process 500, in which the remote user terminal displays information to the user and the user enters the information from the IVRU into the remote user terminal would be replaced by steps in which the remote user terminal transmits information over the communication network to the central controller, and the central controller transmits information over the communication network to the remote user terminal.

Figure 6A:
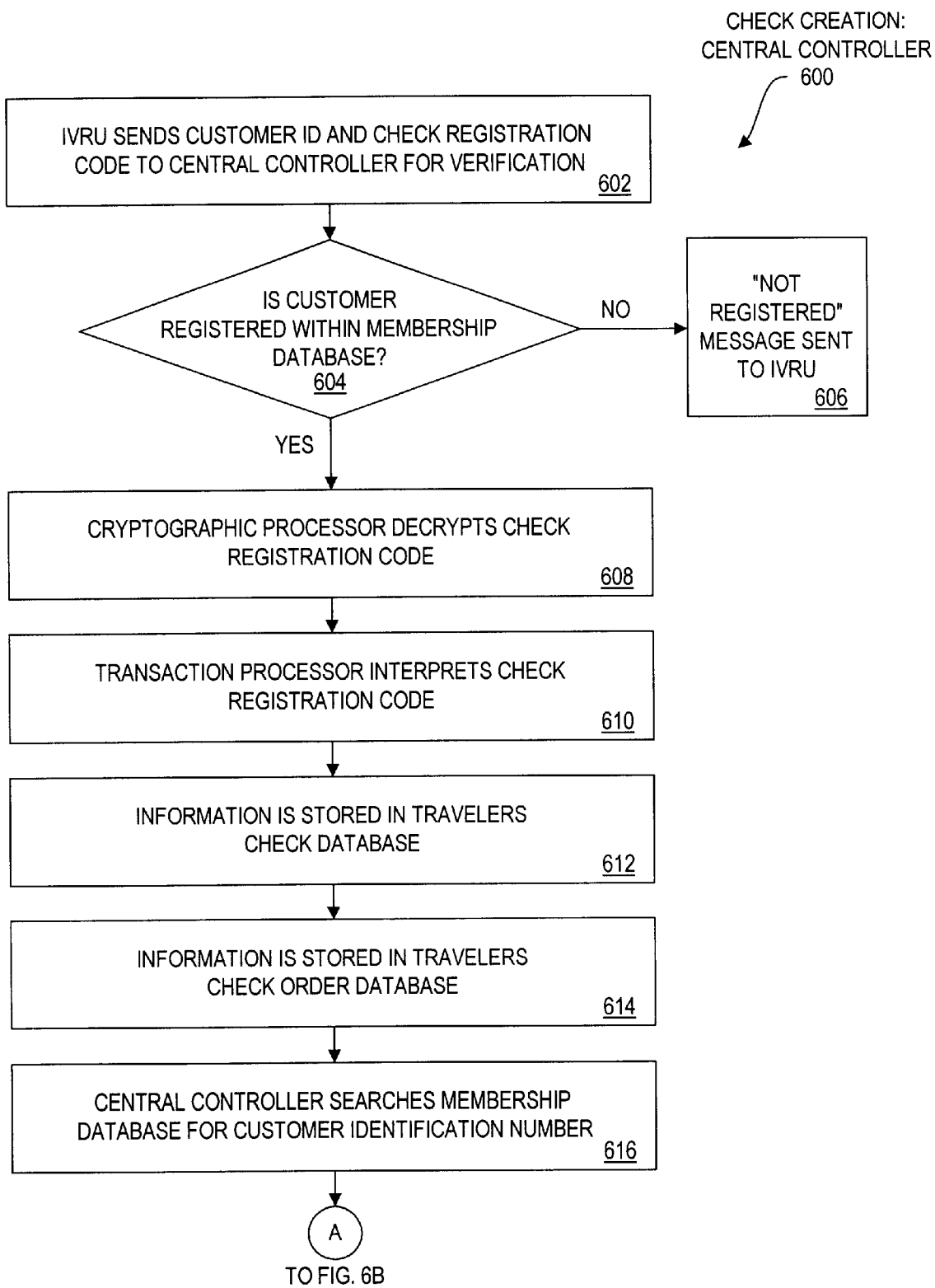
Figure 6B:
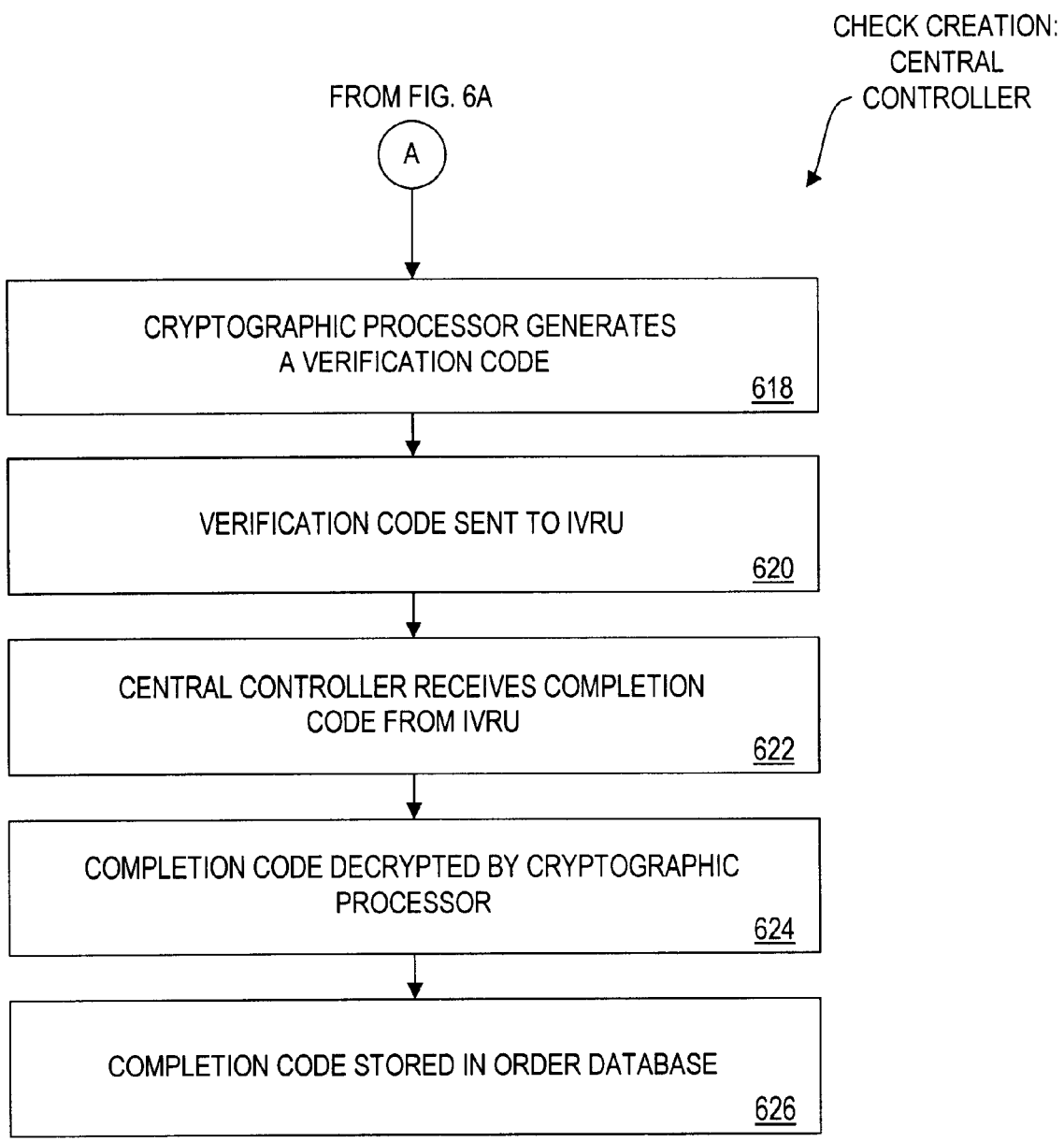

A more detailed description of portions of FIGS. 4a–b is shown in FIGS. 6a–b. A user-generated traveler's check creation process 600, is shown in FIGS. 6a–b. Process 600 is a portion of process 400 of FIGS. 4a–b that is implemented in issuer central controller 200 and issuer voice response unit (IVRU) of FIG. 2a. Steps 602–616 of process 600 are shown in FIG. 6a. Process 600 begins with step 602, in which the IVRU, which received the customer ID and the check registration code from the user, sends the received information to the issuer central controller for verification. In step 604, the central controller determines whether the received customer ID is found in membership database 224, shown in FIG. 2b. If the received customer ID is not found in the membership database, then in step 606, the central controller transmits a "not registered" message to the IVRU, which then informs the user by playing the appropriate prompts. If the customer ID is found in the membership database, then in step 608, cryptographic processor 212 of the central controller, shown in FIG. 2b, decrypts the received check registration code. In step 610, transaction processor 221, shown in FIG. 2b, interprets the decrypted information from the check registration code. In step 612, the appropriate portions of the interpreted information are stored in traveler's check database 222 of FIG. 2b. In step 614, the appropriate portions of the interpreted information are stored in traveler's check order database 225 of FIG. 2b.

In step 616, the central controller searches membership database 224 for the received customer ID.

Steps 618–626 of process 600 are shown in FIG. 6b. In step 618, the cryptographic processor generates a verification code. In step 620, the verification code is transmitted to the IVRU, which transmits it to the user. As described above, the user enters the verification code into the remote user terminal and receives a completion code to transmit to the IVRU. In step 622, the central controller receives the completion code from the IVRU. In step 624, the completion code is decrypted by cryptographic processor 212 and, in step 626, the decrypted completion code is stored in order database 225.

As described above, other embodiments of the check creation process are possible. For example, instead of the user placing a telephone call to the IVRU, the remote user terminal may establish communications with the central controller over the public switched telephone network using a modem, or over a private network using a network adapter. The steps of process 600, in which the IVRU receives information from the user and the IVRU transmits information to the user, would be replaced by steps in which the remote user terminal transmits information over the communication network to the central controller, and the central controller transmits information over the communication network to the remote user terminal.

Figure 7A:
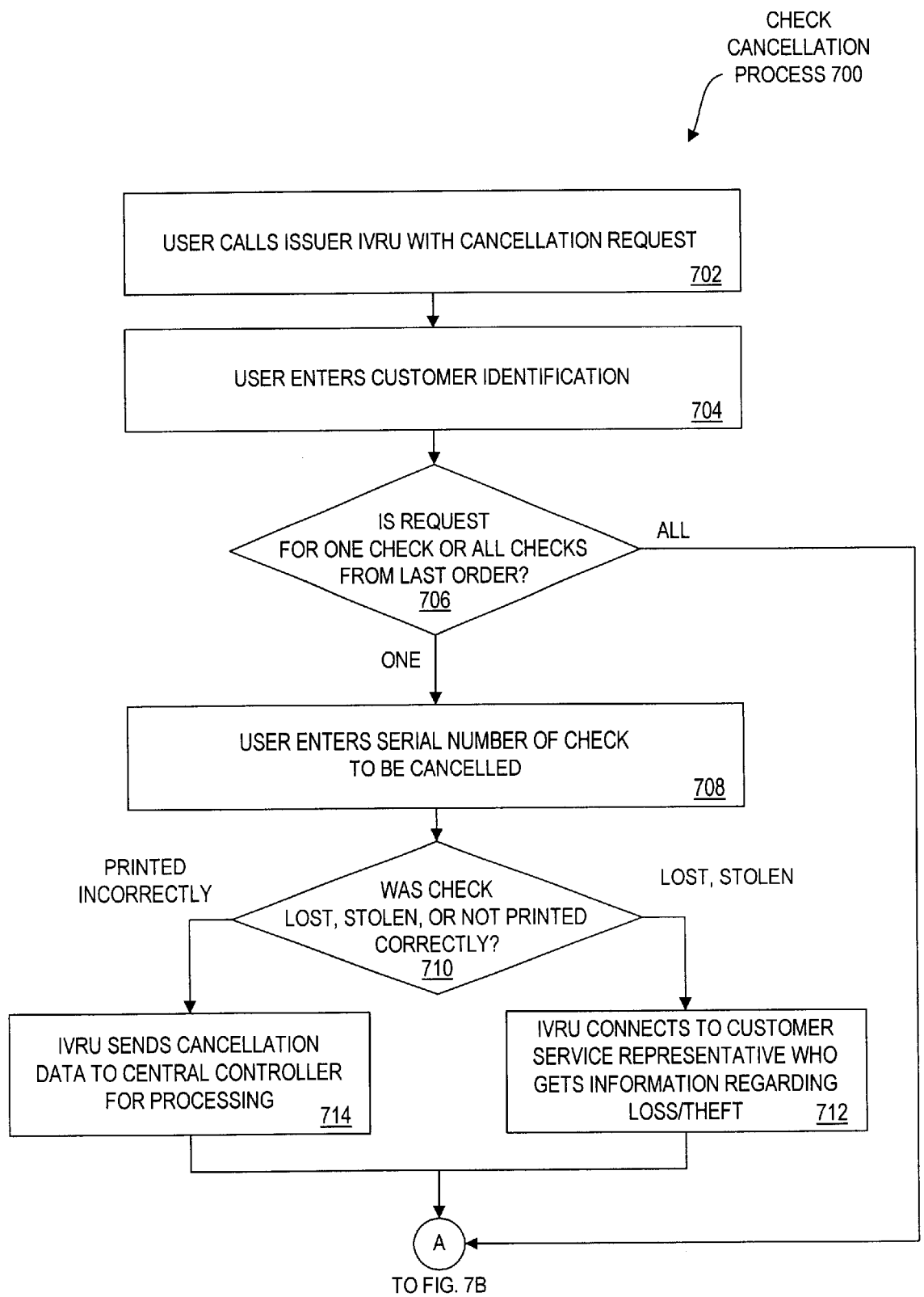
Figure 7B:
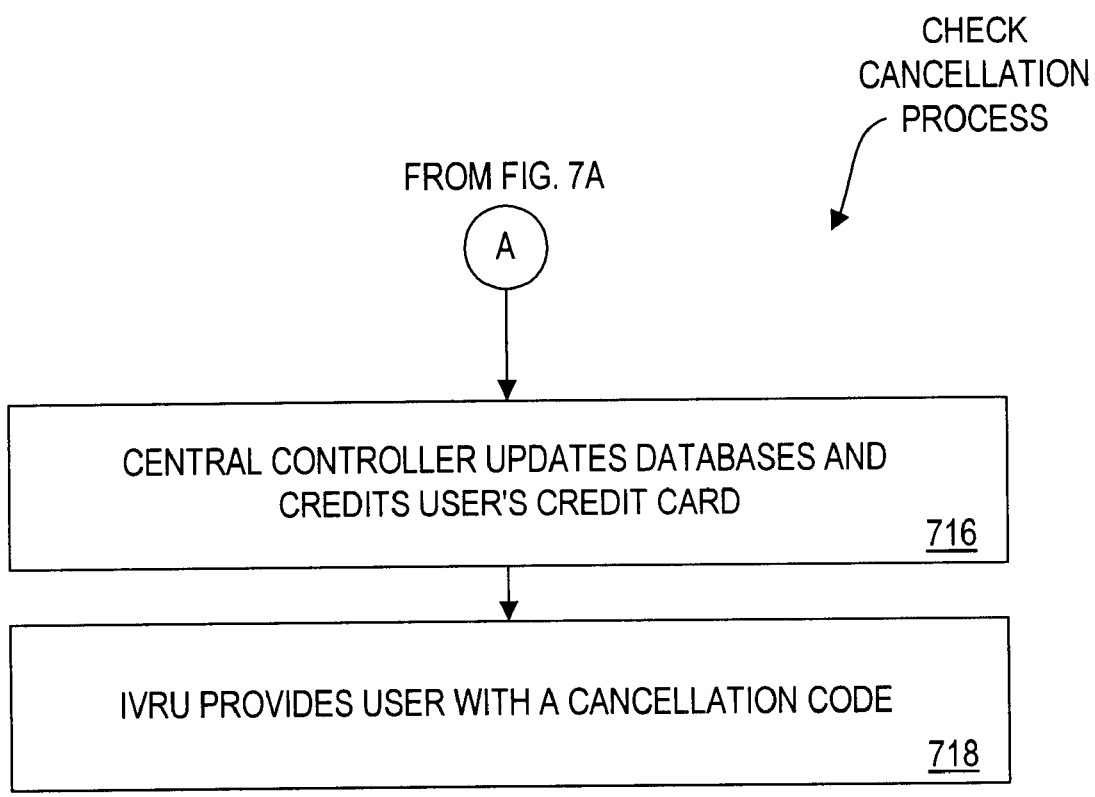

A user-generated traveler's check cancellation process 700, which is implemented in issuer central controller 200 and issuer voice response unit (IVRU) of FIG. 2a, is shown in FIGS. 7a–b. Steps 702–714 of process 700 are shown in FIG. 7a. Process 700 begins with step 702, in which the user places a telephone call to the IVRU in order to enter a traveler's check cancellation request. In step 704, in response to a prompt from the IVRU, the user transmits his customer ID to the IVRU. In step 706, in response to a prompt from the IVRU, the user indicates to the IVRU whether the cancellation request is for an entire check order or for fewer than all the checks in an order. If the cancellation request is for an entire order, then the process continues with step 716 of FIG. 7b, in which the central controller updates the databases to reflect the cancellation of the traveler's checks involved, and credits the user's credit card account with the appropriate monetary amount. If the cancellation request is for fewer than all the checks in an order, then in step 708, in response to a prompt from the IVRU, the user enters the serial numbers of the checks that are to be canceled. In step 710, in response to a prompt from the IVRU, the user indicates whether the checks being canceled were lost, stolen, or printed incorrectly. If the checks were lost or stolen, then in step 712, the IVRU connects the user to a customer service representative, who obtains information regarding the theft or loss. The process then continues with step 716 of FIG. 7b, in which the central controller updates the databases to reflect the cancellation of the traveler's checks involved, and credits the user's credit card account with the appropriate monetary amount. If the checks were printed incorrectly, then in step 714, the IVRU transmits cancellation information to the central controller for processing.

Steps 716–718 of process 700 are shown in FIG. 7b. In step 716, the central controller updates the databases to reflect the cancellation of the traveler's checks involved, and credits the user's credit card account with the appropriate monetary amount. In step 718, the IVRU provides the user with a cancellation code.

As described above, other embodiments of the check creation process are possible. For example, instead of the user placing a telephone call to the IVRU, the remote user terminal may establish communications with the central controller over the public switched telephone network using a modem, or over a private network using a network adapter. The steps of process 700, in which the IVRU receives information from the user and the IVRU transmits information to the user, would be replaced by steps in which the remote user terminal transmits information over the communication network to the central controller, and the central controller transmits information over the communication network to the remote user terminal.

Figure 8A:
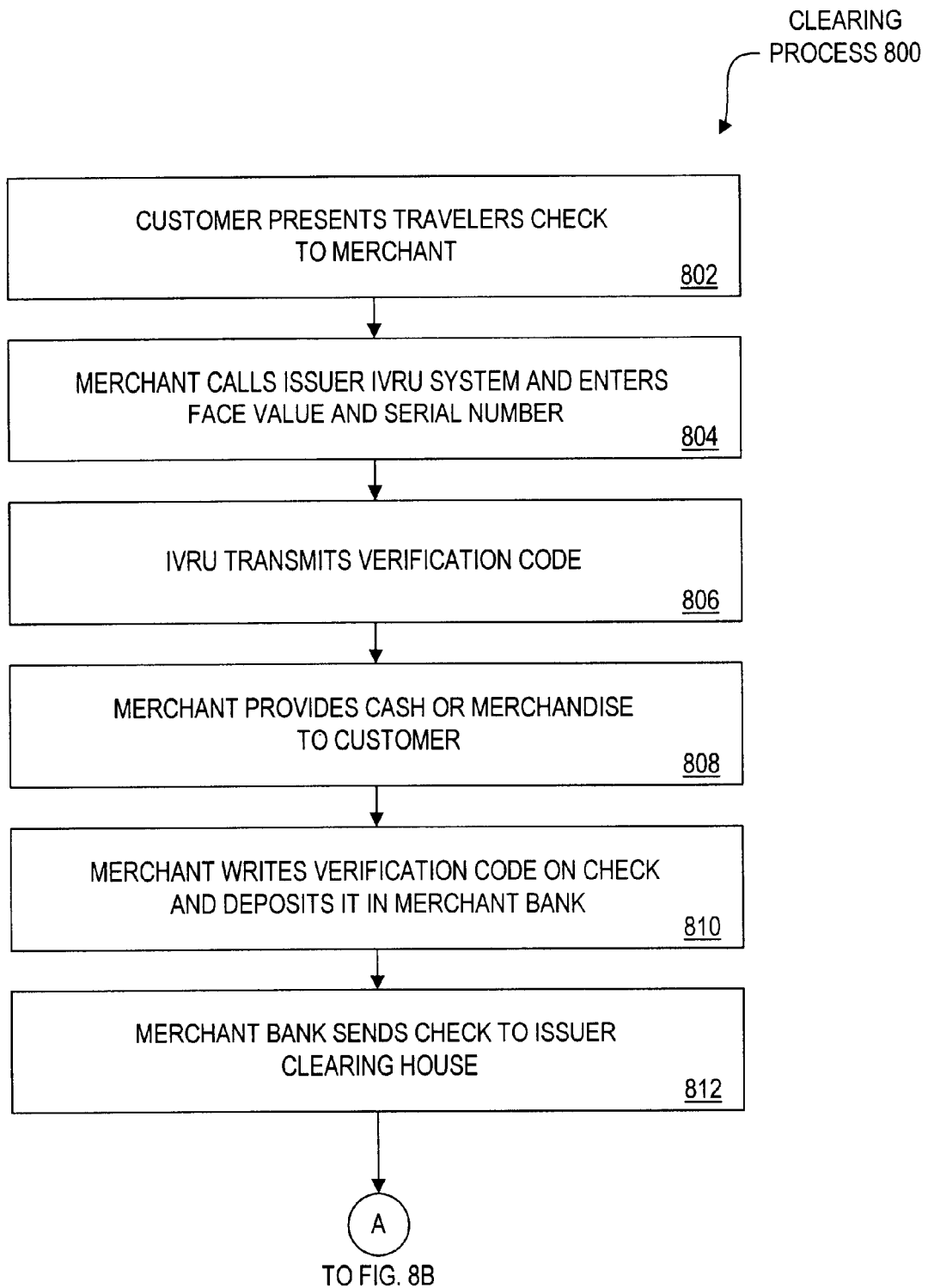
Figure 8B:
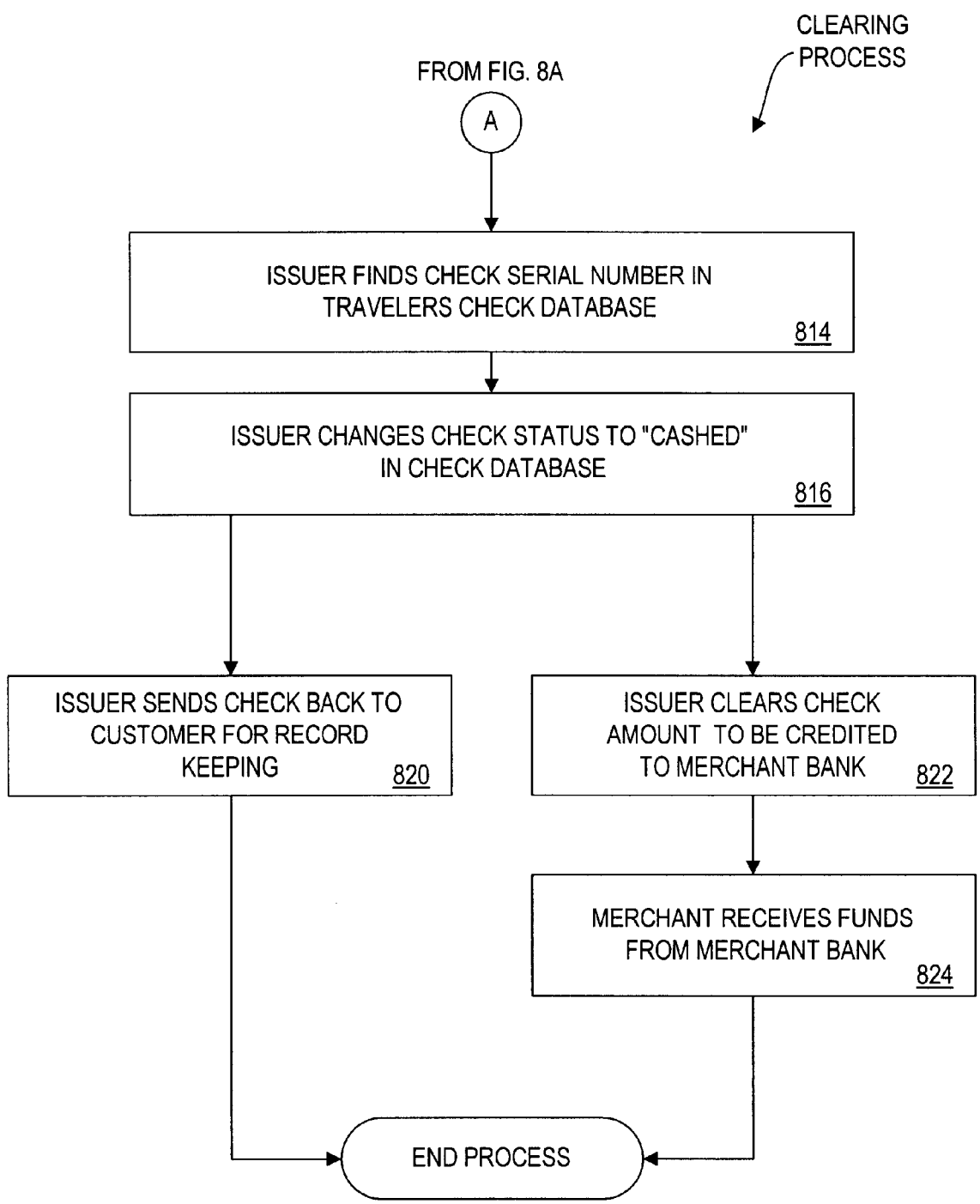

A user-generated traveler's check clearing process 800, which is implemented in issuer central controller 200 and issuer voice response unit (IVRU) 230 of FIG. 2a, is shown in FIGS. 8a–b. Steps 802–812 of process 800 are shown in FIG. 8a. Process 800 begins with step 802, in which a user presents a traveler's check to a merchant. In step 804, the merchant calls the IVRU and, in response to prompts from the IVRU, enters the face value and serial number of the check. In step 806, the IVRU performs the IVRU verification process shown in FIG. 9, and transmits a verification code to the merchant. In step 808, upon receiving the verification code, the merchant provides cash or merchandise to the user. In step 810, the merchant writes or prints the verification code on the check and deposits it in the merchant's bank. In step 812, the merchant bank sends the check to the issuer clearing house.

Steps 814–824 of process 800 are shown in FIG. 8b. In step 814, upon receiving the check from the merchant bank, the issuer finds the record corresponding to the serial number of the received check in traveler's check database 222 of FIG. 2b. In step 816, the issuer changes the data in check status field 326, shown in FIG. 3b, of the found record to indicate that the check has been "Cashed". In step 820, the issuer sends the check back to the user, for the user's records. In step 822, the issuer clears the face value amount of the check, which is credited to the merchant bank. In step 824, the merchant receives the funds from the merchant bank.

As described above, other embodiments of the check clearance process are possible. For example, instead of the merchant placing a telephone call to the IVRU, the merchant terminal may establish communications with the central controller over the public switched telephone network using a modem, or over a private network using a network adapter. The steps of process 800, in which the IVRU receives information from the merchant and the IVRU transmits information to the merchant, would be replaced by steps in which the merchant terminal transmits information over the communication network to the central controller, and the central controller transmits information over the communication network to the merchant terminal.

Figure 9:
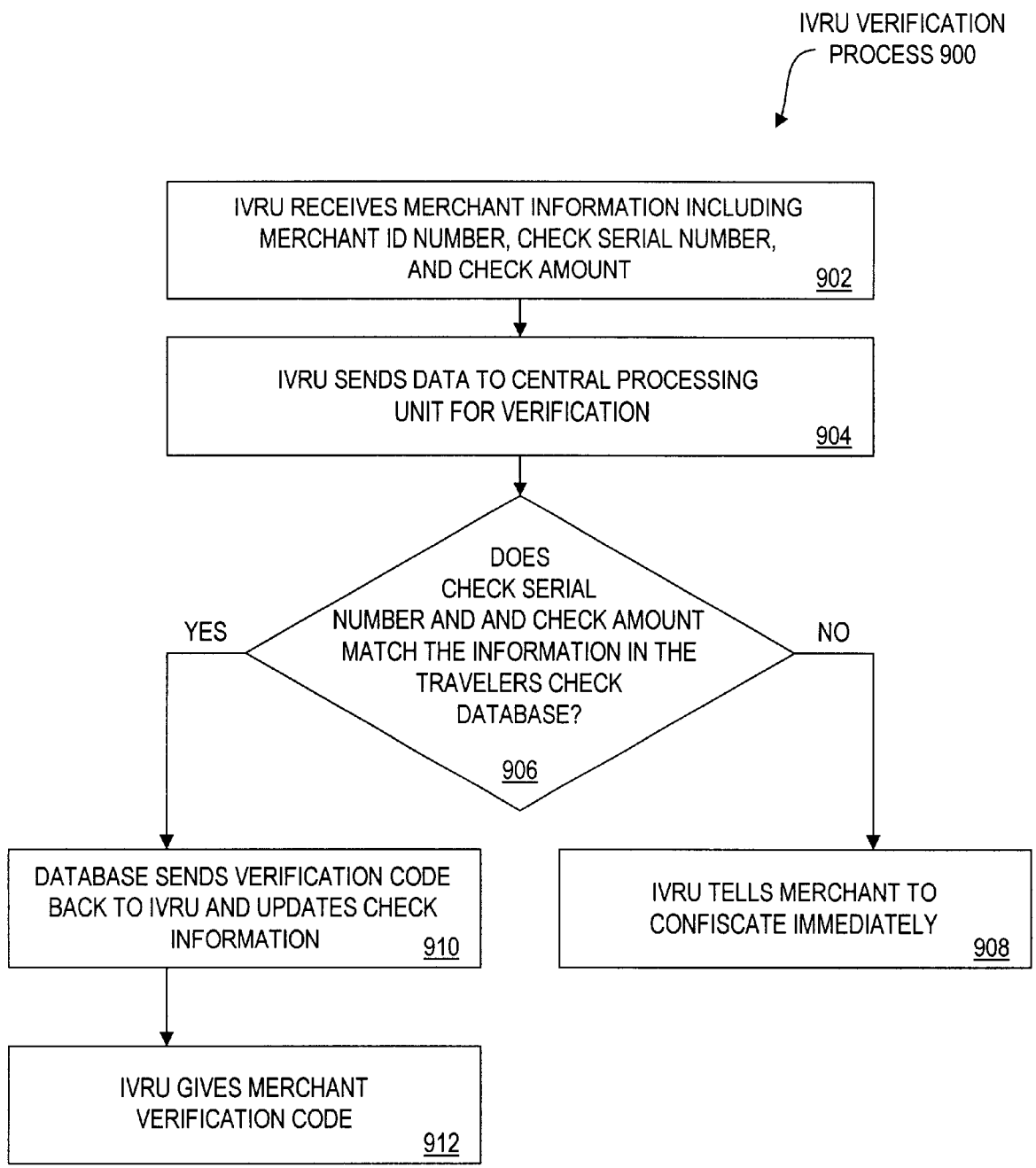

An issuer voice response verification process 900, which is performed as part of step 806, shown in FIG. 8a, and is implemented in issuer central controller 200 and issuer voice response unit (IVRU) 230 of FIG. 2a, is shown in FIG. 9. Process 900 begins with step 902, in which the IVRU receives information from a merchant that has received a traveler's check from a user. The received information includes the merchant ID, the check serial number and the face value amount of the check. In step 904, the IVRU transmits the received information to the issuer central controller for processing. In step 906, the central controller determines whether the check serial number and face value amount match information in traveler's check database 222 of FIG. 2b. If there is no match, then in step 908, the IVRU tells the merchant to immediately confiscate the check and the clearing process is not completed for that check.

If there is a match, then in step 910, the central controller generates an authorization code and transmits it to the IVRU. The central controller also updates information relating to the check in the traveler's check database. In step 912, the IVRU transmits the authorization code to the merchant.

As described above, other embodiments of the check creation process are possible. For example, instead of the merchant placing a telephone call to the IVRU, the merchant terminal may establish communications with the central controller over the public switched telephone network using a modem, or over a private network using a network adapter. The steps of process 900, in which the IVRU receives information from the merchant and the IVRU transmits information to the merchant, would be replaced by steps in which the merchant terminal transmits information over the communication network to the central controller, and the central controller transmits information over the communication network to the merchant terminal.

As described above, the present invention is equally applicable to forms of bearer notes other than traveler's checks. For example, the present invention may be applied to the generation of certified checks. A certified check is a check, such as a personal check or a business check, of a depositor, drawn on a bank, on the face of which the bank has written or stamped the words "accepted" or "certified", along with the signature of a bank official. A certified check is an obligation of the bank, not of the depositor.

In order to generate a certified check, according to the present invention, a depositor writes a personal or business check. The depositor then enters the check value, check number, account number, customer ID and date into the remote user terminal, which generates a registration code. The registration code is then transmitted to the issuer central controller, either over a voice telephone channel via the issuer voice response unit (IVRU), or over a data channel via a modem or a data network. As described above, the remote user terminal may automatically generate some of the required information. The central control determines whether the received customer ID is found in the membership database. If the received customer ID is found in membership database, the specified bank account is checked to ensure that sufficient funds are available to cover the check. If so, the amount of the check is debited to the account and credited to the check certifier. A verification code is then transmitted to the remote user terminal, either directly or through the IVRU and the user. The remote user terminal generates a completion code based on the verification code, transmits the completion code to the central controller, either directly or through the IVRU and the user, and commands the printer to print a certified check having the certification information on the check.

There has thus been provided a new and improved method and system for providing user-generated traveler's checks. The system, which uses components available to the ordinary consumer, permits a user to generate verifiable traveler's checks, in any quantity and denomination selected by the user, without leaving his home or place of business. The system is preferably implemented with user-friendly software, and necessary communications links for the process may be ordinary telephone. Further, such checks can be verified by the cashing merchant, greatly diminishing the likelihood of fraud.

Although a specific embodiment of the present invention has been described, it will be understood by those of skill in the art that there are other embodiments which are equivalent to the described embodiment. Accordingly, it is to be understood that the invention is not to be limited by the specific illustrated embodiment, but only by the scope of the appended claims.

What is claimed is:

1. A method for processing a bearer note at a central controller not in communication with a remote terminal, comprising:

receiving user information from a user;

transmitting a verification code to the user in a human-recognizable format enabling the user to generate the bearer note at the remote terminal;

receiving a completion code from the user;

receiving a request to redeem the bearer note, the request including information associated with the bearer note; and authorizing the redemption of the bearer note based on tile completion code and the request.

2. The method of claim 1, further comprising:

determining a serial number of the bearer note based on the completion code, wherein the information associated with the bearer note included in the request comprises the serial number and said authorizing is performed based on the serial number.

3. The method of claim 1, wherein the user information comprises at least one of (i) a user identifier and (ii) a monetary amount associated with the bearer note.

4. The method of claim 1, wherein the bearer note comprises one of (i) a travelers check and (ii) a certified check.

5. The method of claim 1, wherein the user information comprises a user identifier and a monetary amount associated with the bearer note.

6. The method of claim 6, wherein the human-recognizable format comprises at least one of visible text and an audio message.

7. An apparatus for processing a bearer note at a central controller not in communication with a remote terminal, comprising:

a processor; and a storage device coupled to said processor and storing instructions adapted to be executed by said processor to:

receive user information from a user;

transmit a verification code to the user in a human-recognizable format enabling the, user to generate the bearer note at the remote terminal;

receive a completion code from the user;

receive a request to redeem the bearer note, the request including information associated with the bearer note; and authorize the redemption of the bearer note based on the completion code and the request.

8. The apparatus of claim 7, wherein said storage device further stores instructions adapted to be executed by said processor to:

determine a serial number of the bearer note based on the completion code, wherein the information associated with the bearer note included in the request comprises the serial number and the authorization is performed based on the serial number.

9. The apparatus of claim 7, wherein the user information comprises at least one of (i) a user identifier and (ii) a monetary amount associated with the bearer note.

10. The apparatus of claim 7, wherein the bearer note comprises one of (i) a travelers check and (ii) a certified check.

11. The apparatus of claim 7, wherein the user information comprises a user identifier and a monetary amount associated with the bearer note.

12. The apparatus of claim 7, wherein the human-recognizable format comprises at least one of visible text and an audio message.

13. A medium storing instructions adapted to be executed by a processor to perform a method for processing a bearer note at a central controller not in communication with a remote terminal, said method comprising:

receiving user information from a user;

transmitting a verification code to the user in a human-recognizable format enabling the user to generate the bearer note at the remote terminal;

receiving a completion code from the user;

receiving a request to redeem the bearer note, the request including information associated with the bearer note; and authorizing the redemption of the bearer note based on the completion code and the request.

14. The medium of claim 13, wherein said method further comprises:

determining a serial number of the bearer note based on the completion code, wherein the information associated with the bearer note included in the request comprises the serial number and said authorizing is performed based on the serial number.

15. The medium of claim 13, wherein the user information comprises at least one of (i) a user identifier and (ii) a monetary amount associated with the bearer note.

16. The medium of claim 13, wherein the bearer note comprises one of (i) a travelers check and (ii) a certified check.

17. The medium of claim 13, wherein the user information comprises a user identifier and a monetary amount associated with the bearer note.

18. The medium of claim 13, wherein the human-recognizable format comprises at least one of visible text and an audio message.

19. A method for processing a bearer note at a central controller not in communication with a remote terminal, comprising:

receiving user information from a user;

transmitting a verification code to the user in a human-recognizable format enabling the user to generate the bearer note at the remote terminal;

receiving a completion code from the user;

receiving a request to cancel the bearer note, the request including information associated with the bearer note; and canceling the bearer note based on the completion code and the request.

20. The method of claim 19, further comprising:

determining a serial number of the bearer note based on the completion code, wherein the information associated with the bearer note included in the request comprises the serial number and said canceling is performed based on the serial number.

21. A method for processing a bearer note at a central controller not in communication with a remote terminal, comprising:

receiving a check registration code at the central controller, the check registration code being (i) received from a user and (ii) generated by the remote terminal based on user information;

generating a verification code in response to the receipt of the check registration code;

transmitting the verification code to the user in a human-recognizable format enabling the user to generate the bearer note at the remote terminal;

receiving a completion code from the user;

receiving a request to redeem the bearer note, the request including information associated with the bearer note; and authorizing the redemption of the bearer note based on the completion code and the request.

22. A method of issuing and clearing a bearer note, comprising:

receiving user information including:
a user identifier, and
a monetary amount of the bearer note to be generated;

transmitting, from a central controller to a user, a verification code to be presented to the user in a human-recognizable format, the verification code for use by the user in generating the bearer note at a remote terminal not in communication with the central controller;

receiving a completion code from the user;

determining a serial number of the bearer note from the completion code;

maintaining a database comprising the serial number of the bearer note;

receiving a request to redeem the bearer note, the request including the serial number of the bearer note;

examining the database to determine whether the received serial number is valid; and redeeming the bearer note, if the received serial number is valid.

23. The method of claim 22, wherein the human-recognizable format comprises at least one of visible text and an audio message.

24. A system for issuing and clearing a bearer note, comprising:

means for receiving, from a user, user information including a user identifier and a monetary amount of the bearer note to be generated;

means for transmitting, from a central controller to the user, a verification code to be presented to the user in a human-recognizable format, the verification code for use by the user in generating the bearer note at a remote terminal not in communication with the central controller, means for receiving a completion code from the user;

means for determining a serial number of the bearer note from the completion code;

database means for storing the serial number of the bearer note generated by the user;

means for receiving a request to redeem the bearer note, the request including the serial number of the bearer note;

means for examining the database to determine whether the received serial number is valid; and means for authorizing the redemption of the bearer note, if the received serial number is valid.

25. The method of claim 24, wherein the human-recognizable format comprises at least one of visible text and an audio message.

26. A method of generating and canceling a bearer note, comprising:

receiving user information including:
a user identifier, and
a monetary amount of the bearer note to be generated;

transmitting, from a central controller to a user, a verification code to be presented to the user in a human-recognizable format, the verification code for use by the user in generating the bearer note at a remote terminal not in communication with the central controller;

receiving a completion code from the user;

determining a serial number of the issued bearer note from the completion code;

maintaining a database comprising the serial number of the bearer note generated by the user;

receiving a request to cancel the bearer note, the request including the serial number of the bearer note;

examining the database to determine whether the received serial number is entered in the database; and canceling the bearer note, if the received serial number is entered.

27. The method of claim 26, further comprising:

crediting an account owned by the user by an amount determined based on the monetary value.

28. The method of claim 26, wherein the human-recognizable format comprises at least one of visible text and an audio message.

* * * * *